Nov. 19, 1929.   P. S. LEGGE   1,736,608
SAW
Filed Jan. 27, 1927
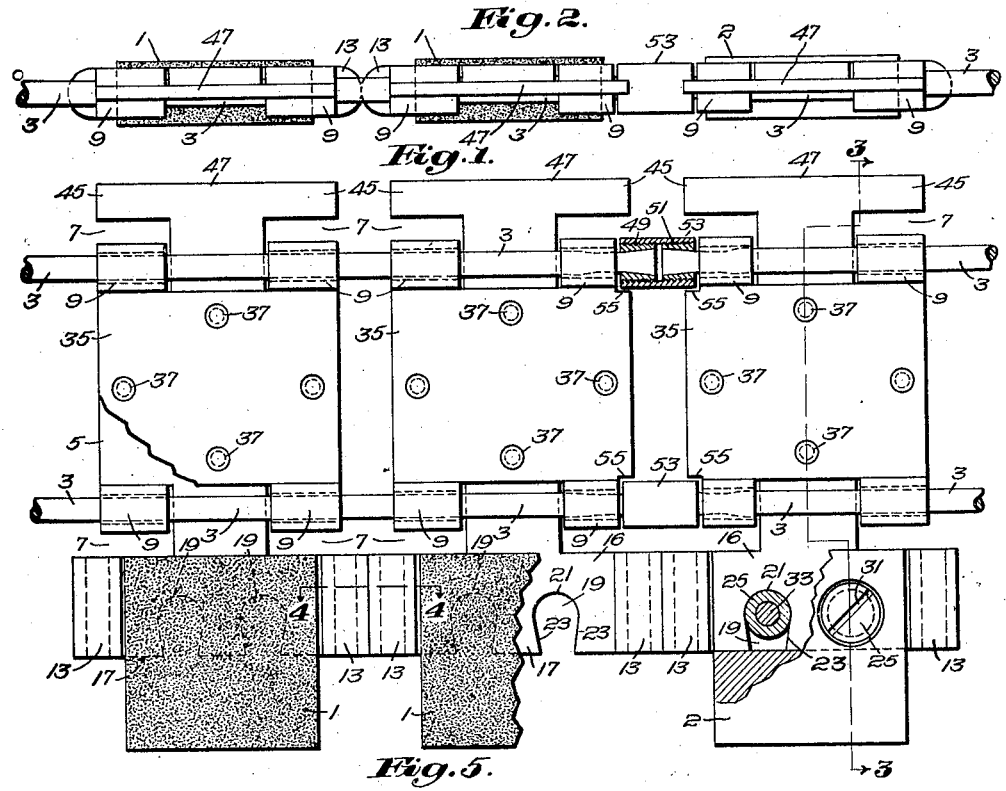
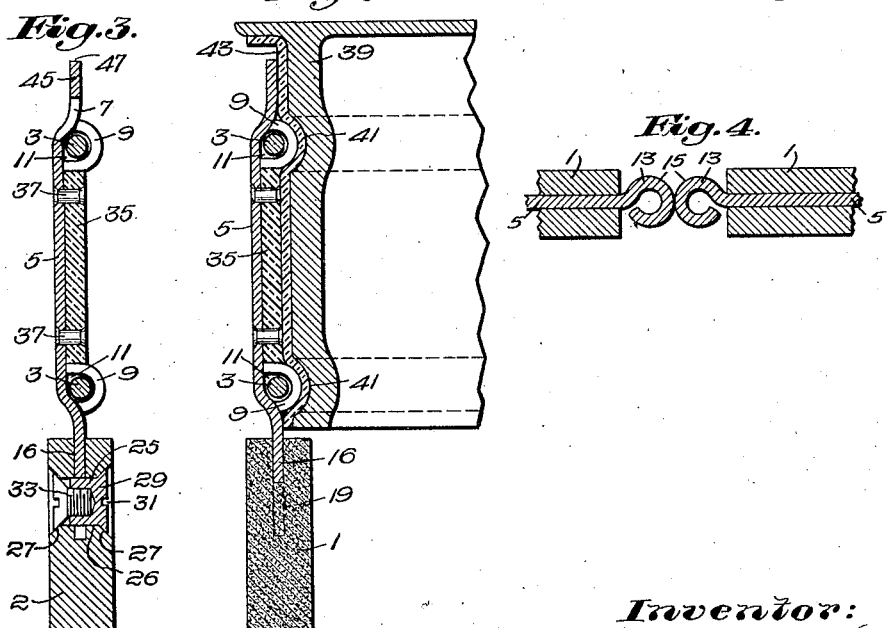
Inventor:
Peter S. Legge,
by Emery Booth Janney & Varney
Attys.

Patented Nov. 19, 1929

1,736,608

UNITED STATES PATENT OFFICE

PETER S. LEGGE, OF SOMERVILLE, MASSACHUSETTS

SAW

Application filed January 27, 1927. Serial No. 164,071.

My invention relates to saws, and particularly but not exclusively to one of the band saw type for sawing stone.

The invention will be best understood from the following description when read in the light of the accompanying drawing showing one specific embodiment of the invention, while the scope of the invention will be more particularly pointed out in the appended claims.

In the drawing:—

Fig. 1 is an elevation showing a section of the length of the saw with parts broken away;

Fig. 2 is a plan view of the saw according to Fig. 1;

Figs. 3 and 4 respectively are sections on the lines 3—3 and 4—4 of Fig. 1; and

Fig. 5 is a radial section through the rim of a pulley with a saw constructed according to Fig. 1 passing over it.

Referring to the drawing I have shown a saw which comprises a row of spaced saw teeth 1 and 2 carried by a plurality of flexible members herein exemplified by a pair of wire cables 3.

As illustrated, the saw teeth are carried on flat plate like members 5 which at opposite sides near their tops and bottoms are cut away as shown at 7 and bent to form the laterally projecting lugs 9 providing perforations 11 through which the cables are threaded. The diameters of the perforations preferably are such as to present no more clearance with the cable than necessary to thread the cable through the lugs, although for convenience of illustration this clearance has been slightly exaggerated.

Herein for spacing the saw teeth 1, the members 5 at their lower ends are bent to form portions 13 presenting cylindrical surfaces 15 in rolling contact facilitating the passage of the saw about a guiding or driving pulley when employed in connection with such pulley.

As shown the lowermost portions 16 of the members 5 are offset in alignment with the axial lines of the cables 3, and at their lower edges 17 are formed with openings 19 having the semi-circular edges 21 connected to said edges 17 by converging edges 23. Herein the portions 16 carry the saw teeth which may be of any suitable form, for example those indicated at 1 in Fig. 1 may be of a mixture of carborundum grains and a suitable binder molded about the lower edges of the members 5 and baked to render them hard. The carborundum mixture when molded over the members 5 fills the openings 19 and in effect forms a dove-tail joint with said members, which securely holds the teeth thereon.

The tooth indicated at 2 in Figs. 2 and 3 may be of steel, and as illustrated is secured to the member 5 by means of plugs 25 fitting holes 26 formed through the tooth in registry with the semi-circular portions 21 of the openings 19. As shown the hole 26 is countersunk at opposite ends as indicated at 27, the plug 25 having a flat head 29 fitting one of these countersunk portions, which head is provided with a slot 31 for receiving the screw engaging end of a screw driver. As shown the plug 25 is held in position in the hole 26 formed in the tooth by a flat head machine screw 33 extending into the end of said hole opposite said plug.

Conveniently the saw may be provided with a pulley engaging facing herein exemplified by the plates 35 which may be of yielding material such as rubber secured to the members 5 by rivets 37. As shown the lugs 9 project laterally beyond the outer faces of the plates 35 so as to provide means for engagement with cooperating parts for preventing slipping of the saw off the guiding or driving pulley or pulleys over which it passes. As illustrated by Fig. 5 the rims of the pulleys referred to may be formed as indicated at 39 so as to present grooves 41 which receive the lugs 9, the face of the pulley herein being indicated as faced with a layer 43 of rubber or other yielding material which, in conjunction with the yieldable plates 35, facilitates proper fit of the saw with the face of the pulley.

As illustrated in Figs. 1 and 3 the upper ends of the plates 5 are offset into alignment with the axes of the cables to provide portions 45, the upper edges 47 of which provide tracks for engagement with any sort of a suitable pressure device for the saw.

The ends of the cables 3, when the device is used as a band saw, may be joined by securing to one of said ends in a known manner a right hand screw threaded sleeve 49 and to the other end a left hand screw threaded sleeve 51, which sleeves may be joined by a coupling sleeve 53 having at the respective opposite ends thereof internal right and left hand screw threads. As shown the plates 5 adjacent the coupling sleeve are notched as indicated at 55 to permit the corresponding lugs 13 to contact.

It will be understood that within the scope of the invention wide deviations may be made from the specific embodiment thereof herein described without departnig from the spirit of the invention.

Claims:

1. A saw having, in combination, an elongated flexible member, a row of saw teeth, means operatively supporting said teeth in spaced relation on said flexible member comprising separate tooth-carrying-members threaded on said flexible member, adjacent tooth-carrying-members having abutting portions in rolling contact.

2. A saw having, in combination, means for supporting a row of saw teeth comprising tooth-carrying-members, said members formed with laterally projecting eyes through which passes a cable for supporting said members.

3. A saw having, in combination, means for supporting a row of saw teeth comprising tooth-carrying-members, said members formed with lugs adapted to be received in recesses in a saw guiding or driving pulley, said lugs having perforations through which passes a cable for supporting said members.

4. A saw having, in combination, a plurality of parallel cables, members having laterally extending lugs adapted to be received by recesses in a saw driving or guiding pulley, said lugs having perforations through which said cables pass, saw teeth carried by said members, said members and said lugs lying between the planes defining the opposite sides of the saw cut adapted to be formed by said saw teeth.

5. A saw having, in combination, a plurality of parallel cables, members having laterally extending lugs adapted to be received by recesses in a saw driving or guiding pulley, said lugs having perforations through which said cables pass, a pulley engaging facing carried by said members between said lugs, saw teeth carried by said members; said members, lugs and facing lying between the planes defining the opposite sides of the saw cut adapted to be formed by said saw teeth.

6. A saw having, in combination, a plurality of parallel cables, members having laterally extending lugs adapted to be received by recesses in a saw driving or guiding pulley, said lugs having perforations through which said cables pass, a pulley engaging facing of yielding material carried by said members between said lugs, saw teeth carried by said members; said members, lugs and facing lying between the planes defining the opposite sides of the saw cut adapted to be formed by said saw teeth.

In testimony whereof, I have signed my name to this specification.

P. S. LEGGE.